US010305931B2

(12) United States Patent
Reddy et al.

(10) Patent No.: US 10,305,931 B2
(45) Date of Patent: May 28, 2019

(54) INTER-DOMAIN DISTRIBUTED DENIAL OF SERVICE THREAT SIGNALING

(71) Applicant: Cisco Technology, Inc., San Jose, CA (US)

(72) Inventors: K Tirumaleswar Reddy, Karnataka (IN); Daniel G. Wing, San Jose, CA (US); Flemming Stig Andreasen, Marlboro, NJ (US); Michael David Geller, Weston, FL (US)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 15/297,241

(22) Filed: Oct. 19, 2016

(65) Prior Publication Data

US 2018/0109555 A1 Apr. 19, 2018

(51) Int. Cl.
| | |
|---|---|
| *G06F 7/04* | (2006.01) |
| *H04L 29/06* | (2006.01) |
| *G06F 21/55* | (2013.01) |
| *H04W 12/12* | (2009.01) |
| *H04W 4/70* | (2018.01) |

(52) U.S. Cl.
CPC ........ *H04L 63/1458* (2013.01); *G06F 21/554* (2013.01); *H04W 12/12* (2013.01); *G06F 2221/2111* (2013.01); *H04W 4/70* (2018.02)

(58) Field of Classification Search
CPC ........................ H04L 63/1458; H04L 63/1491
USPC ............................................................ 726/4
See application file for complete search history.

(56) References Cited

U.S. PATENT DOCUMENTS

| | | | |
|---|---|---|---|
| 2004/0148520 A1 | 7/2004 | Talpade et al. | |
| 2012/0174220 A1 | 7/2012 | Rodriguez | |
| 2012/0216282 A1* | 8/2012 | Pappu | H04L 63/1416 726/23 |
| 2014/0181966 A1* | 6/2014 | Carney | H04L 63/1491 726/22 |
| 2016/0036837 A1* | 2/2016 | Jain | H04L 63/1416 726/23 |

(Continued)

OTHER PUBLICATIONS

Mortenson, et al., "Distributed-Denial-of-Service (DDos) Open Threat Signaling Architecture, draft-mortensen-dots-architecture-00", DOTS Architecture, Internet-Draft, Mar. 19, 2016, 22 pages.

*Primary Examiner* — Samson B Lemma
(74) *Attorney, Agent, or Firm* — Edell, Shapiro & Finnan, LLC

(57) ABSTRACT

In one embodiment, a primary server receives, from a client device, a first request to mitigate an external attack on the client device. The primary server sends, to a plurality of secondary servers, a second request to mitigate the external attack, wherein each one of the plurality of secondary servers has associated mitigation resources, and receives from at least one of the plurality of secondary servers an indication that it has mitigation resources capable of mitigating the external attack. The primary server sends, to the client device, a list including the secondary servers having mitigation resources capable of mitigating the attack, and receives, from the client device, an indication that a subset of the list is selected to mitigate the external attack. In response, the primary server sends a request for mitigation services to one of the secondary servers in the subset selected to mitigate the external attack.

20 Claims, 7 Drawing Sheets

(56) References Cited

U.S. PATENT DOCUMENTS

2016/0173526 A1* 6/2016 Kasman ............. H04L 63/1458
 726/23
2018/0091547 A1* 3/2018 St. Pierre ............ H04L 63/1458

* cited by examiner

INTER-DOMAIN DISTRIBUTED DENIAL OF SERVICE THREAT SIGNALING

TECHNICAL FIELD

The present disclosure relates to the selection of secondary DDOS mitigation service providers to mitigate an ongoing denial-of-service attack on computing resources.

BACKGROUND

The number of distributed denial-of-service attacks (DDoS) in computing environments has recently increased dramatically. These attacks are particularly dangerous because a DDoS attack may originate from several sources simultaneously, flooding a targeted device with malicious or invalid packets that overwhelm the resources of the targeted device. Furthermore, as more and more appliances become IP-enabled, e.g., Internet of Things (IoT) devices, the threat of computing environments becoming susceptible to DDoS attacks is steadily increasing. In certain deployments, such as government and financial networks, such threats may lead to server outages, costly damages, or worse. For example, a malicious party may launch a DDoS attack on domestic financial networks, possibly causing billions of dollars of damage and temporarily shutting down markets worldwide. Because of the severe and direct impact these attacks can have, there is a continued desire to implement an effective mechanism to detect and prevent or minimize the threat of DDoS attacks.

DESCRIPTION OF EXAMPLE EMBODIMENTS

Overview

Figure 1:
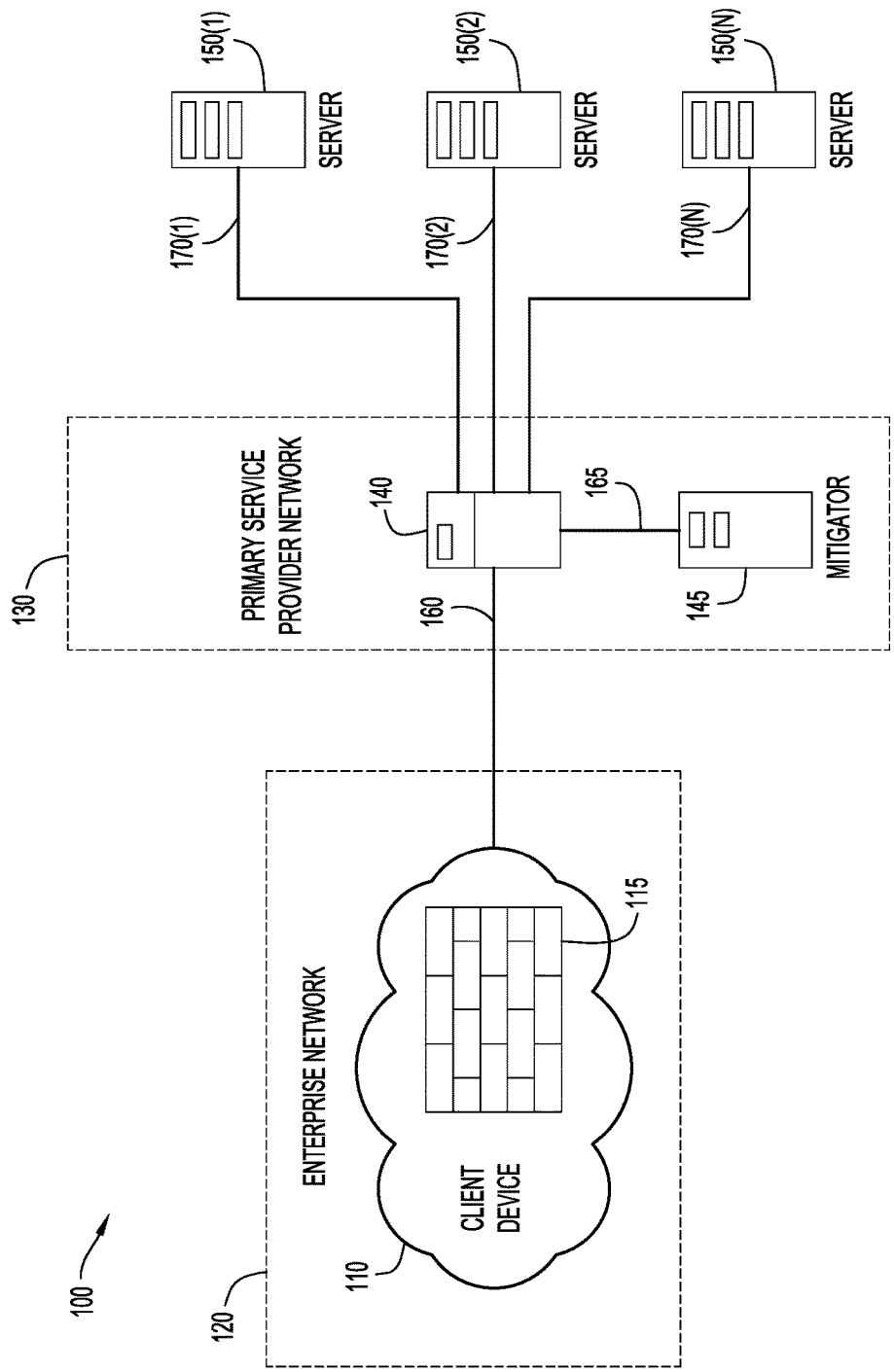
FIG. 1 is a diagram illustrating a mitigation management system in which secondary service providers are securely selected to provide mitigation services, according to an example embodiment.

In accordance with one embodiment, a primary server receives, from a client device, a first request to mitigate an external attack on resources associated with the client device. If the DDOS attack grows beyond the capabilities of the mitigation resources associated with the primary server, the primary server sends, to a plurality of secondary servers, a second request to determine which of the secondary servers are capable of mitigating the external attack, wherein each one of the plurality of secondary servers has at least one associated mitigation service comprising mitigation resources. In response to sending the second request, the primary server receives from at least one of the plurality of secondary servers an indication that the at least one secondary server has mitigation resources capable of mitigating the external attack. The primary server sends, to the client device, a list comprising the secondary servers having mitigation resources capable of mitigating the attack, and receives, from the client device, an indication that a subset of the list is selected to mitigate the external attack. The client device then receives, from the primary server, an authorization token from one of the secondary servers in the subset selected to mitigate the external attack, wherein the authorization token enables the client device to access the mitigation resources associated with the secondary server in the subset selected to mitigate the external attack.

In accordance with another embodiment, a client device sends, to a primary server, a request to mitigate an external attack on resources associated with the client device, and, if the DDOS attack grows beyond the capabilities of the mitigation resources associated with the primary server, the client device receives, from the primary server, a list of at least one secondary server having an associated mitigation service comprising mitigation resources capable of mitigating the external attack. The client device then selects a subset of the list to provide the mitigation services to mitigate the external attack and sends an indication, to the primary server, that the subset of the list has been selected to provide the mitigation services. The client device then receives, from the primary server, an authorization token from one of the secondary servers in the subset selected to mitigate the external attack, wherein the authorization token enables the client device to access the mitigation resources associated with the secondary server in the subset.

Example Embodiments

In response to the increase in DDoS attacks, DDOS mitigation service providers have begun to offer mitigation services that scrub incoming data directed at a target device and remove all data associated with a known attack profile. Unfortunately, as the size and frequency of these attacks increases, many service providers find that they do not have the resources to successfully mitigate an ongoing attack, and need to leverage the resources of alternate service providers. DDoS open threat signaling (DOTS) techniques provide a mechanism in which a service provider may signal one or more requests for mitigation assistance to alternate service providers. For example, by utilizing the DOTS functionality, a target of a malicious attack may identify a potentially saturating event requiring data scrubbing, e.g., a DDoS attack, and signal a request to a primary service provider to take appropriate mitigation action. After the service provider identifies mitigation resources capable of mitigating the attack, the effected traffic flows may then be routed to the mitigation resources for mitigation services, e.g., scrubbing.

In using DDoS defense mechanisms, however, a primary service provider may inadvertently share sensitive information concerning the attack, including target details such as the target's private keys, IP address range of the target and the ports, protocols and services running on the target device as well as the geographic location of the target, with one or more unknown or untrusted secondary service providers, creating a security breach to an enterprise owner. For example, for privacy reasons, enterprise owners of target devices may not want to share sensitive data with secondary service providers that are unknown to them or reside in a different country and/or jurisdiction.

With reference first to FIG. 1, there is depicted a block diagram of a mitigation management system 100 in which secondary service providers are securely selected to provide mitigation services, includes an enterprise network 120, which may comprise one or more client devices 110 and a firewall 115, a primary service provider network 130, comprising a primary server 140 having one or more associated mitigators 145, and one or more secondary servers 150(1)-150(N).

As shown in FIG. 1, client device 110 in enterprise network 120 is in communication with primary server 140 in a primary service provider network 130 via communication link 160. In turn, primary server 140 is in communication with one or more mitigators 145 via link 165 and with one or more secondary servers 150(N) via communication links 170(1)-170(N). It should be appreciated that communication links 160, 165 and 170(N) may include one or more wide area networks (WANs), such as the Internet, and one or more local area networks (LANs).

Client device 110 may be a wired or wireless communication device and may operate in accordance with any communication/network technology, including, but not limited to, Ethernet, Wi-Fi®, Bluetooth®, 4G or LTE, etc. For example, client device 110 may be a laptop, tablet, smartphone, server, etc. Firewall 115 may be any network device, such as a router, switch, firewall, gateway, etc. Primary server 140 may be any device that is configured to receive one or more requests for mitigation services from client device 110 and is further configured to receive mitigation capability status reports from a plurality of secondary servers 150(N).

In operation, client device 110 initially detects that it is being subjected to a malicious attack. Although FIG. 1 shows client device 110 as the target of the attack, it should be understood that the target of the malicious attack, e.g., a DDoS attack, may be client device 110, one or more computing resources associated with client device 110, or a combination thereof. In response to determining that it is the target of a malicious attack, client device 110 sends a request for mitigation services, and details of the attack, such as the identification and geographic location of the target device and the data rate of the incoming attack, to primary server 140. Primary server 140 may forward the request and attack details to one or more associated mitigators 145, which determines whether it has sufficient mitigation resources to successfully mitigate the incoming attack. If mitigator 145 determines that it has the mitigation resources needed to mitigate the attack, it notifies primary server 140 and traffic destined for client device 110 is thereafter routed via mitigator 145 to client device 110.

If, however, mitigator 145 determines that it does not have the necessary mitigation resources, it notifies primary server 140 that it is unable to mitigate the current attack. In response, primary server 140 may forward a request for mitigation resources, and the associated attack details, to one or more secondary servers 150(N), which may respectfully determine their ability to provide mitigation resources to successfully mitigate the attack. According to an embodiment, primary server 140 has a prior relationship and/or a mitigation service agreement with each of the secondary servers 150(1)-150(N) to provide mitigation resources, if necessary. Primary server 140 also has a prior relationship and/or mitigation service agreement with client device 110.

Using the attack details sent by primary server 140, each of the one or more servers 150(1)-150(N) determines whether it has mitigation resources capable of mitigating the current attack and, if so, may send a signal to primary server 140 indicating that it is capable of mitigating the current attack.

According to an alternative embodiment, primary server 140 may periodically request status updates from each of the one or more secondary servers 150(1)-150(N) with which it has a prior relationship and/or service agreement and use the status updates to determine whether each of the one or more servers 150(1)-150(N) has mitigation resources capable of mitigating the current attack. According to a further embodiment, prior to sending a mitigation request to the plurality of secondary servers 150(1)-150(N) to mitigate the external attack, primary server 140 may send, to client device 110, a candidate list of the plurality of secondary servers 150(1)-150(N), wherein the candidate list of the plurality of secondary servers 150(N) includes secondary servers that are candidates to provide services to mitigate the external attack. Primary server 140 may then receive, from client device 110, a subset of the candidate list of the plurality of secondary servers 150(N) approved by client device 110 to mitigate the external attack such that the mitigation request is sent to only one or more of the plurality of secondary servers 150(N) included in the subset approved to mitigate the external attack.

After determining which of the secondary servers 150(1)-150(N) has mitigation resources capable of mitigating the current attack, primary server 140 may send a list of one or more secondary servers 150(N) having sufficient mitigation resources to client device 110, which may select a subset of the list of one or more secondary servers 150(N) to mitigate the attack and send an indication of the selected subset to primary server 140. According to an embodiment, the subset of the list of one or more secondary servers 150(N) may include only one secondary server selected by client device 110 to provide mitigation services. In response, primary server 140 may select at least one of the secondary servers, e.g., 150(2), in the subset to mitigate the attack and send a request for an authorization token to the selected secondary server, e.g., 150(2). According to an embodiment, the authorization token may be an Open Authorization (OAuth) 2.0 token. In response, the selected secondary server, e.g., 150(2), sends an authorization token over a secure communication channel, e.g., OAuth 2.0 token, to primary server 140, which, in turn, forwards the authorization token to client device 110 over a secure communication channel. In response, client device 110 sends the authorization token to the selected secondary server over a secure communication channel, e.g., 150(2), to gain access to the mitigation resources associated with the selected secondary server, e.g., 150(2). Incoming data destined for client device 110 is then routed to the associated mitigation resources, which scrub the data prior to the data being sent to client device 110.

Generally, in deployments such as those shown in FIG. 1, to prevent the unauthorized leakage of sensitive and/or proprietary information, it may be desirable to allow client device 110 to initially define, and/or dynamically update, the one or more secondary servers 150(N) to which primary server 140 is authorized to send a mitigation request as well as detailed information associated with a malicious attack. Accordingly, the system and method described herein provide for a mechanism wherein client device 110 may generate a subset of one or more approved secondary servers 150(N) from a list of a plurality of secondary servers 150(1)-150(N) with which primary server 140 has an existing relationship.

By limiting the mitigation services to only those secondary servers 150(N) approved by client device 110, client device 110 may expressly prevent the unauthorized leakage of sensitive details related to an ongoing attack, and may control the location to where the flow of proprietary incoming data is to be sent. Furthermore, the system and method described herein provide for a system wherein client device 110, primary server 140, and one or more secondary servers 150(N) may trust each other. For example, because primary server 140 has a prior relationship with both client device 110 and one or more secondary servers 150(N), the one or more secondary servers 150(N) may securely send an authorization token to primary server 140 and trust, when it receives the authorization token from client device 110, that the client device 110 is who it purports to be.

As discussed in greater detail below, primary server 140 may be a stand-alone computer or a server running one or more applications responsible for controlling the operations of one or more denial-of-server (DOS) monitoring logic components in one or more computing devices. Alternatively, primary server 140 may be an application running in a cloud/data-center environment.

Figure 2:
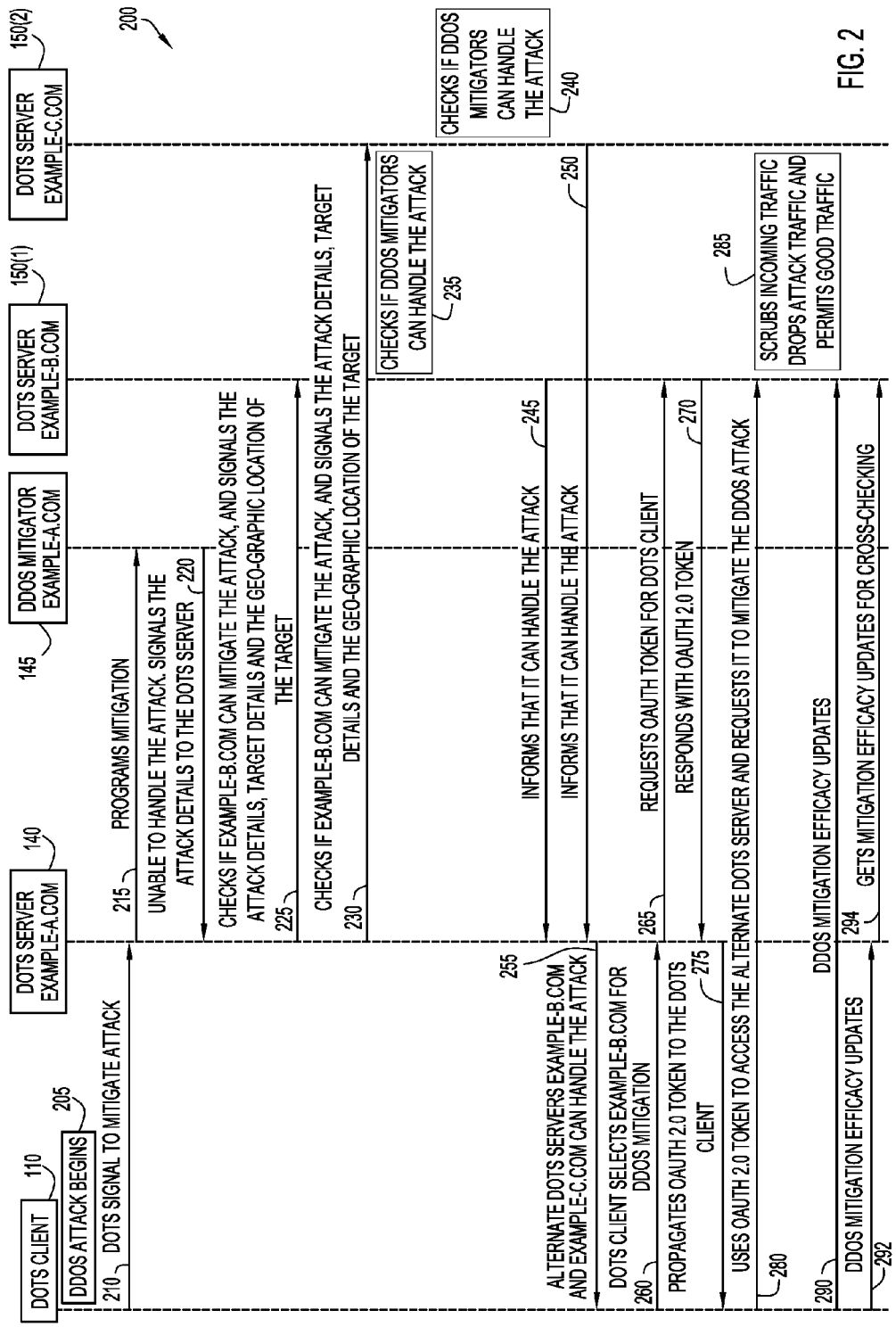
FIG. 2 is a signal diagram illustrating communications in a mitigation management system among a client device, a primary server, and a plurality of secondary servers, according to an example embodiment.

Reference is now made to FIG. 2, which shows a signal diagram illustrating communications 200 occurring among a client device 110, a primary server 140, and a plurality of secondary servers 150(N) performing the operations of the mitigation management system of FIG. 1, according to an embodiment. As shown in FIG. 2, at 205, client device 110 determines that resources with which it is associated are the target of a malicious attack, e.g., a DDOS attack. At 210, in response to determining that the associated resources are the target of a malicious attack, client device 110 sends a request to primary server 140 to mitigate the attack. For example, client device 110 may send a DOTS signal to server 140 requesting that server 140 mitigate the attack. At 215, primary server 140 initially responds to the mitigation request by sending to mitigator 145 a request to provide mitigation resources to client device 110. At 220, mitigator 145 determines that it does not have the resources to mitigate the attack on client device 110 and informs primary server 140 that it is unable to mitigate the attack and forwards attack details, such as incoming traffic rate, type of attack, and target details such as target identification information and the geographic location of the target, to primary server 140.

At 225, primary server 140 sends a mitigation request, including the attack details, to server 150(1) to determine whether server 150(1) has mitigation resources capable of mitigating the attack. At 230, primary server 140 also sends a mitigation request including the attack details to server 150(2) to determine whether server 150(2) has mitigation resources capable of mitigating the attack. Optionally, as discussed above, primary server 140 may send a list of candidate secondary servers, e.g., 150(1) and 150(2), to client device 110 prior to sending one or more mitigation requests to one or more secondary servers, e.g., 150(1) and 150(2), so that client device 110 may select which of the candidate secondary servers 150(N) should be queried about their mitigation capabilities. At 235, secondary server 150(1) checks to see whether it has resources capable of mitigating the attack and, at 240, secondary server 150(2) checks to see whether it has resources capable of mitigating the attack. At 245, after confirming that it has sufficient resources, secondary server 150(1) sends an indication to primary server 140 that it can mitigate the attack. Similarly, at 250, after confirming that it has sufficient resources, server 150(2) sends an indication to primary server 140 that it also can mitigate the attack.

At 255, primary server 140 sends, to client device 110, a list indicating that both secondary server 150(1) and secondary server 150(2) have sufficient resources to mitigate the attack. At 260, in response to receiving the list of secondary servers, e.g., 150(1) and 150(2), that have sufficient resources to mitigate the attack, client device 110 selects secondary server 150(1) to mitigate the attack and sends to primary server 140 an indication that it has selected secondary server 150(1) to mitigate the attack. At 265, in response to receiving the indication from client device 110, primary server 140 sends a request for an authorization token to secondary server 150(1). For example, primary server 140 may send a request to secondary server 150(1) for an OAuth 2.0 token. At 270, secondary server 150(1) responds by sending an authorization token, e.g., an OAuth 2.0 token, to primary server 140, which, at 275, forwards the authorization token to client device 110. At 280, client device 110 uses the authorization token to access the mitigation resources associated with secondary server 150(1), and, at 285, secondary server 150(1) scrubs the incoming traffic for client device 110, dropping traffic associated with the malicious attack and forwarding the non-malicious traffic to client device 110.

At 290, client device 110 sends to secondary server 150(1) an efficiency report related to the mitigation services provided by secondary server 150(1), and, at 292, also sends, to primary server 140, an efficiency report related to the mitigation services. At 294, primary server 140 requests and receives an efficiency report from server 150(1), which primary server 140 uses with the efficiency report received from client device 110 to confirm that secondary server 150(1) is successfully mitigating the current attack. According to an embodiment, the one or more efficiency reports received from client device 110 and server 150(1) include data concerning the ongoing attack, such as amount of traffic (Gb/sec), amount of data scrubbed, amount of good traffic, number of connections, information allowing the client device 110 to see whether the attack has been successfully mitigated or whether the attack is still ongoing, etc.

Figure 3:
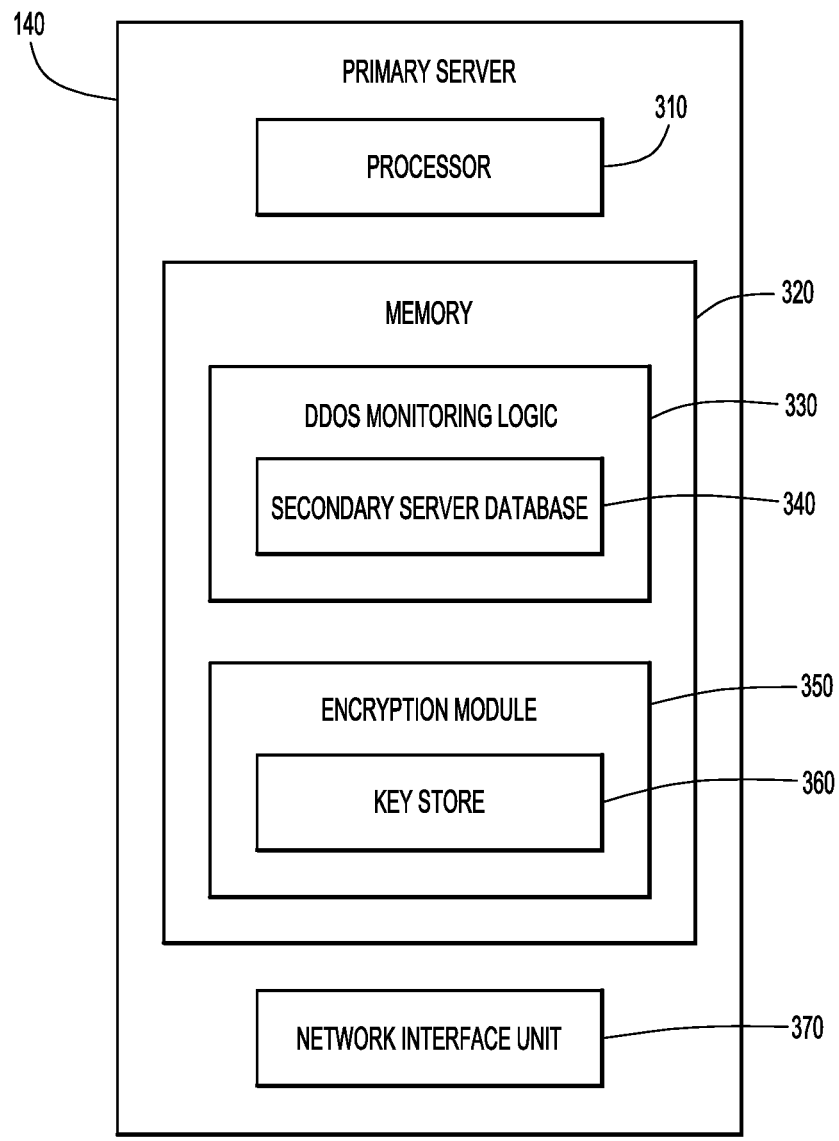
FIG. 3 is a block diagram of a primary server configured to participate in the operations of the mitigation management system, according to an example embodiment.

Reference is now made to FIG. 3, which shows the primary server 140 of FIG. 1 in more detail, according to an embodiment. As shown in FIG. 3, primary server 140 may include one or more processors 310 and a memory 320. The memory 320 stores executable software instructions for denial-of-service (DOS) monitoring logic 330 and encryption module 350, and data for a secondary server database 340 and key store 360. The controller further includes one or more network interface units 370 that enable communications to client device 110 and to one or more secondary servers 150(N).

The one or more processors 310 may be a microprocessor or a microcontroller. The memory 320 may include read only memory (ROM), random access memory (RAM), magnetic disk storage media devices, optical storage media devices, flash memory devices, electrical, optical, or other physical/tangible memory storage devices. Thus, in general, memory 320 may include one or more tangible (non-transitory) computer readable storage media (e.g., a memory device) encoded with software comprising computer executable instructions and when the software is executed (by processor 310) it is operable to perform the operations of the primary server 140 described herein.

DDOS monitoring logic 330 includes instructions enabling primary server 140 to manage the operations of receiving an attack status from client device 110 as well as determining the mitigation capability status of one or more secondary servers 150(N) with which primary server 140 has a prior relationship and/or a mitigation service agreement. For example, in response to receiving a notification that client device 110 is the target of a malicious attack, DDOS monitoring logic 330 may send a request for mitigation capability status to each of one or more secondary servers 150(1)-150(N) and store the mitigation status responses in secondary server database 340. Optionally, to ensure that the mitigation status information stored in secondary server database 340 for each of the one or more secondary servers 150(1)-150(N) is current, DDOS monitoring logic 330 may further include instructions for periodically requesting capability status updates from each of the secondary servers 150(1)-150(N), i.e., not in response to an ongoing attack. It should be understood, therefore, that primary server 140 may send a request for mitigation capability status to each of the secondary servers 150(1)-150(N) in response to an ongoing attack or, alternatively, periodically after a predetermined time period has expired.

According to an embodiment, DDOS monitoring logic 330 may send to client device 110 a list of candidate secondary servers 150(N) capable of mitigating an ongoing attack based on the mitigation capability status information maintained in secondary server database 340. DDOS monitoring logic 330 may further receive from client device 110 one or more efficiency reports related to the provision of mitigation services for an ongoing attack and request one or more efficiency reports from the secondary server 150(N) providing the mitigation services, enabling DDOS monitoring logic 330 to cross-check the information included in the one or more efficiency reports received from the secondary server 150(N) with the one or more efficiency reports received from client device 110. According to a further embodiment, DDOS monitoring logic 330 may also function as a DOTS server.

Encryption module 350 further includes instructions enabling primary server 140 to establish a secure communication channel with one or more secondary servers 150(N) and to establish a secure communication channel with client device 110. According to an embodiment, encryption module 350 may further store one or more public keys associated with client device 110, one or more private keys uniquely associated with primary server 140, one or more public keys associated with one or more secondary servers 150(N).

Figure 4:
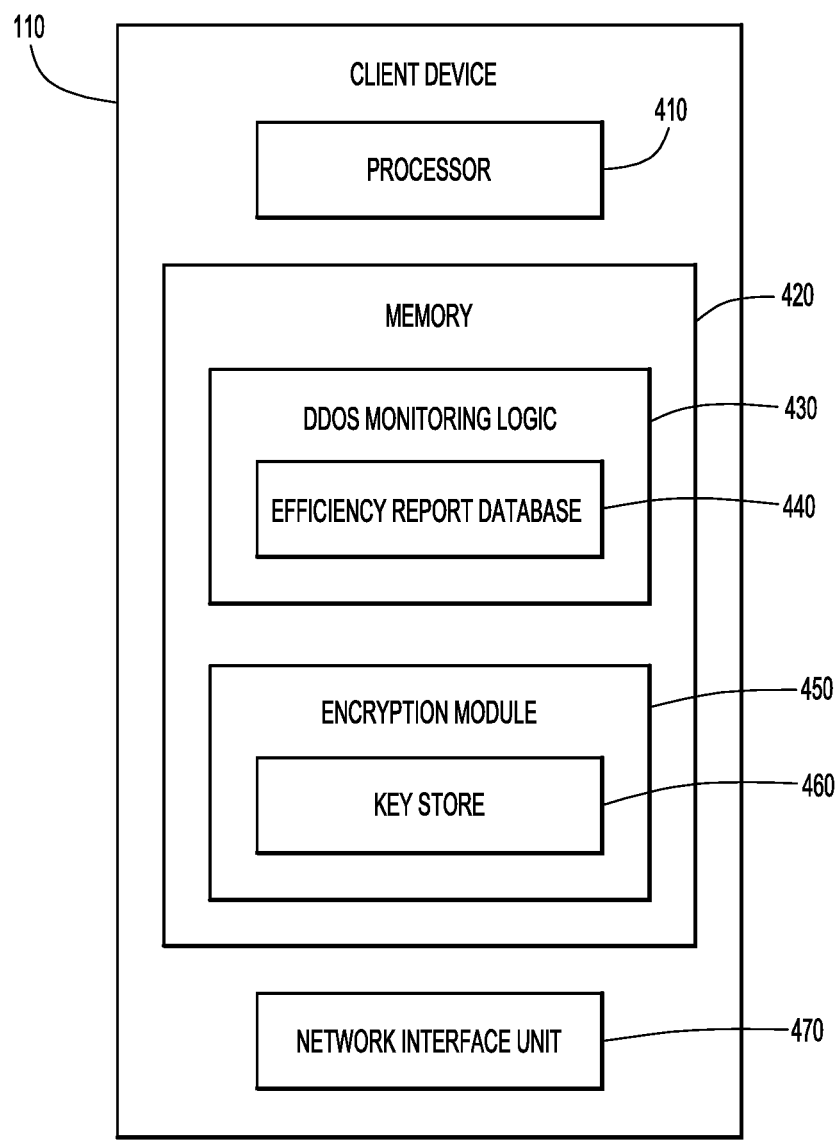
FIG. 4 is a block diagram of a client device configured to participate in the operations of the mitigation management system, according to an example embodiment.

Reference is now made to FIG. 4, which shows the client device 110 of FIG. 1 in more detail, according to an embodiment. As shown in FIG. 4, client device 110 may include one or more processors 410 and a memory 420. The memory 420 stores executable software instructions for DOS monitoring logic 430 and encryption module 450, and data for efficiency report database 440 and key store 460. The controller further includes one or more network interface units 470 that enable communications to primary server 140 and one or more secondary servers 150(N).

The one or more processors 410 may be a microprocessor or a microcontroller. The memory 420 may include read only memory (ROM), random access memory (RAM), magnetic disk storage media devices, optical storage media devices, flash memory devices, electrical, optical, or other physical/tangible memory storage devices. Thus, in general, memory 420 may include one or more tangible (non-transitory) computer readable storage media (e.g., a memory device) encoded with software comprising computer executable instructions and when the software is executed (by processor 410) it is operable to perform the operations of the client device 110 described herein.

DDOS monitoring logic 430 may include instructions enabling client device 110 to request mitigation services from one or more primary servers 140, with which client device 110 has a prior relationship and/or a service agreement and to manage the operations of the mitigation services provided by primary server 140 and/or one or more secondary servers 150(N). The management functions performed by DDOS monitoring logic 430 include, but are not limited to, selecting one or more secondary servers 150(N) to provide mitigation services and forwarding incoming traffic to the one or more secondary servers 150(N) selected to provide the mitigation services. For example, in response to requesting mitigation services from primary server 140, DDOS monitoring logic 430 may receive a list of one or more secondary servers 150(N) capable of mitigating the attack, via network interface 470, and may return, to primary server 140, a selection of a subset of the list of the one or more secondary servers 150(N) that DOS monitoring logic 430 has authorized to provide the mitigation services.

DDOS monitoring logic 430 may further include instructions enabling client device 110 to generate one or more efficiency reports related to the provision of mitigation services and to send the one or more efficiency reports to the one or more secondary servers 150(N) providing the mitigation services, as well as to a primary server 140 associated with the one or more secondary servers 150(N), enabling primary server 140 to validate that the one or more secondary servers 150(N) are successfully providing the mitigation services. According to an embodiment, DDOS monitoring logic 430 may store the generated one or more efficiency reports related to the provision of mitigation services in efficiency report database 440. According to a further embodiment, DDOS monitoring logic 430 may also function as a DOTS client.

Figure 5:
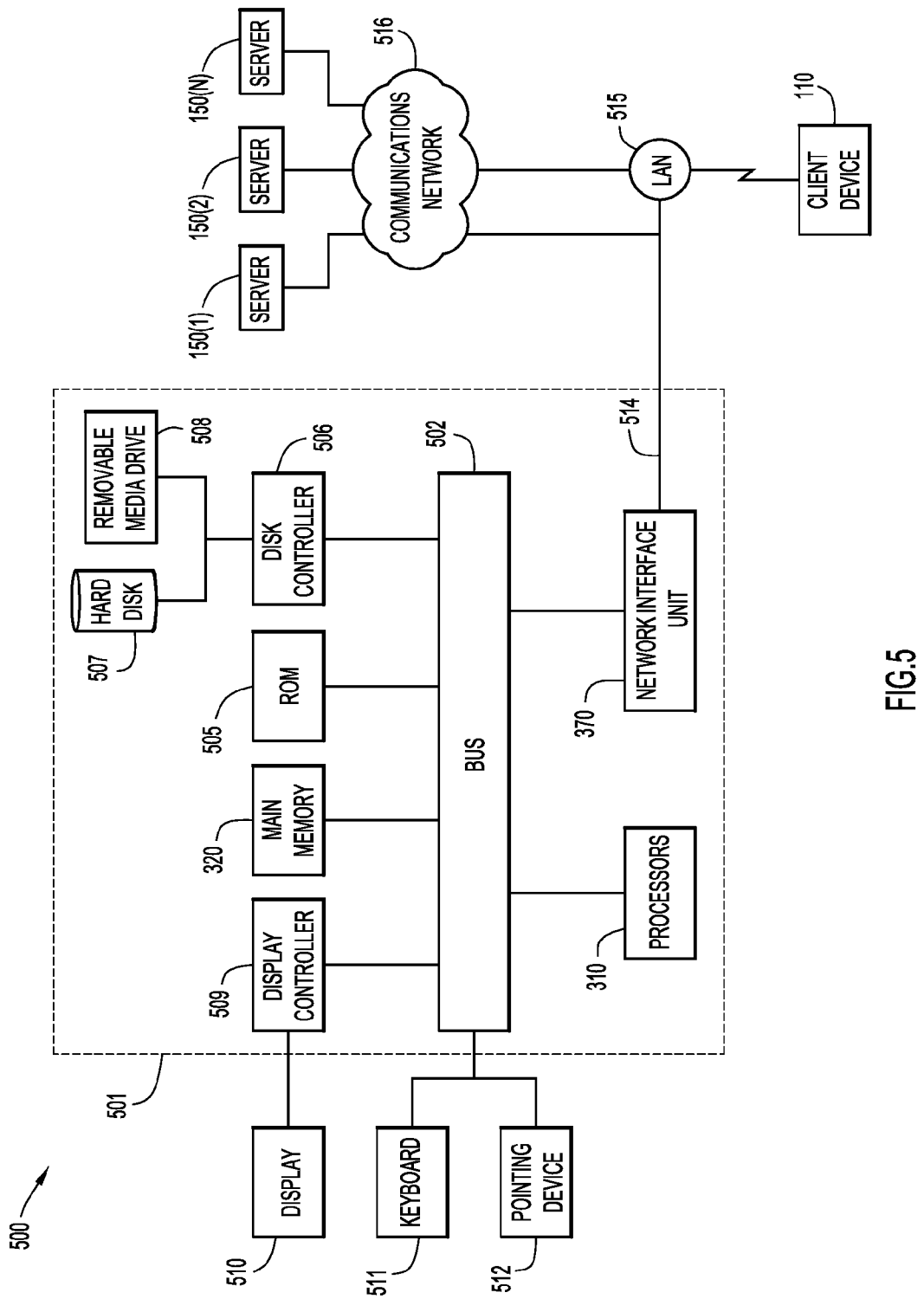
FIG. 5 is a block diagram of a computing device configured to perform the operations of a primary server in the operations of the mitigation management system, according to an example embodiment.

Encryption module 450 may include instructions enabling client device 110 to establish a secure communication channel with one or more secondary servers 150(N) and primary server 140. According to an embodiment, encryption module 450 may further include a key store 460 may store one or more private encryption keys uniquely associated with client device 110, one or more public encryption keys associated with primary server 140, one or more public encryption keys associated with one or more secondary servers 150(N), FIG. 5 illustrates a system environment 500 in which the embodiments presented may be implemented. As shown in FIG. 5, system environment 500 may include a computer system 501, a client device 110 communicating with the computer system 501 through a local area network (LAN) 515, and one or more secondary servers 150(N) communicating with computer system 501 over communication network 516.

The computer system 501 may be programmed to implement a computer based device, such as a primary server 140, for managing a mitigation response to an ongoing malicious attack, e.g., a DDOS, against a client device 110. The computer system 501 includes a bus 502 or other communication mechanism for communicating information, and a processor 310 coupled with the bus 502 for processing the information. While the figure shows a signal block 310 for a processor, it should be understood that the processors 310 represent a plurality of processing cores, each of which can perform separate processing. The computer system 501 also includes a main memory 320, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 310. In addition, the main memory 320 may be used for storing temporary variables or other intermediate information during the execution of instructions by the processor 310.

The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 310.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such a liquid crystal display, light emitting diode (LED) display, etc., for displaying information to a computer user. The computer system 500 includes input devices, such as a keyboard 511 and a pointing device 512, for interacting with a computer user and providing information to the processor 310. The pointing device 512, for example, may be a mouse, a trackball, or a pointing stick for communicating direction information and command selections to the processor 310 and for controlling cursor movement on the display 510. In addition, a printer may provide printed listings of data stored and/or generated by the computer system 501.

The computing system 501 performs a portion or all of the processing steps described herein in response to the processor 310 executing one or more sequences of one or more instructions contained in a memory, such as the main memory 320. Such instructions may be read into the main memory 320 from another computer readable medium, such as a hard disk 507 or a removable media drive 508. One or more processors in a multi-processing arrangement may also be employed to execute the sequences of instructions contained in main memory 320. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the described embodiments, and for enabling the computer system 501 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 370 coupled to the bus 502. The communication interface 370 provides a two-way data communication coupling to a network link 514 that is connected to, for example, a LAN 515, or to another communications network 516 such as the Internet. For example, the communication interface 513 may be a wired or wireless network interface card to attach to any packet switched (wired or wireless) LAN. As another example, the communication interface 370 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 370 sends and receives electrical, electromagnetic or optical signals that carry digital data streams representing various types of information.

The network link 514 typically provides data communication through one or more networks to other data devices. For example, the network link 514 may provide a connection to another computer through a local are network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 370, which carry the digital data to and from the computer system 501 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 370. Moreover, the network link 514 may provide a connection through a LAN 515 to a client device 110, such as a personal digital assistant (PDA) laptop computer, cellular telephone, or server. The network link 514 may further provide a connection through the communications network 516 to one or more secondary servers 150(N).

Figure 6:
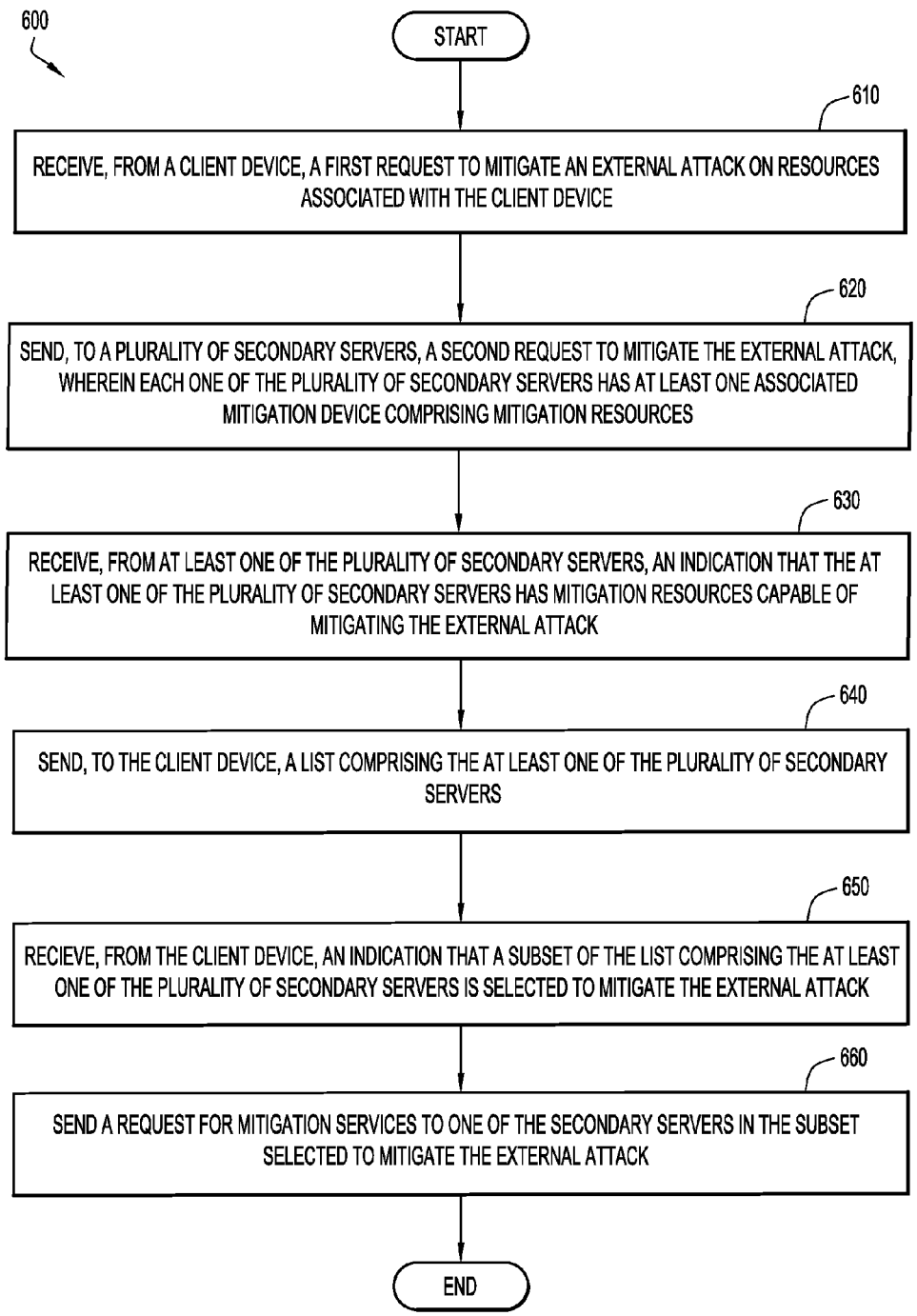
FIG. 6 is a flowchart depicting operations performed by a primary server to securely select a secondary server to mitigate an ongoing denial of service attack on a client device, according to an example embodiment.

With reference to FIG. 6 and continued reference to FIGS. 1, 2, 3, 4 and 5, a flowchart is shown of a process 600 performed by a primary server 140 to securely select a secondary server 150(N) to mitigate an ongoing denial of service attack on a client device 110, according to an example embodiment.

At 610, primary server 140 receives, from client device 110, a first request to mitigate an external attack on resources associated with client device 110.

At 620, primary server 140 sends to a plurality of secondary servers 150(N), a second request to mitigate the external attack, wherein each one of the plurality of secondary servers 150(1)-150(N) has at least one associated mitigation device comprising mitigation resources.

At 630, primary server 140 receives, from at least one of the plurality of secondary servers 150(N), an indication that the at least one of the plurality of secondary servers 150(N) has mitigation resources capable of mitigating the external attack, and, at 640, primary server 140 sends to client device 110, a list comprising the at least one of the plurality of secondary servers 150(N).

At 650, primary server 140 receives, from client device 110, an indication that a subset of the list comprising the at least one of the plurality of secondary servers 150(N) is selected to mitigate the external attack.

At 660, primary server 140 sends a request for mitigation services to the one of the secondary servers 150(N) in the subset selected to mitigate the external attack, and method 600 ends. According to an embodiment, primary server 140 may further send a request for an authorization token to the one of the secondary servers 150(N) in the subset selected to mitigate the external attack and forward the authorization token to client device 110 enabling client device 110 to access the mitigation resources associated with the secondary server 150(N) selected to mitigate the external attack.

Figure 7:
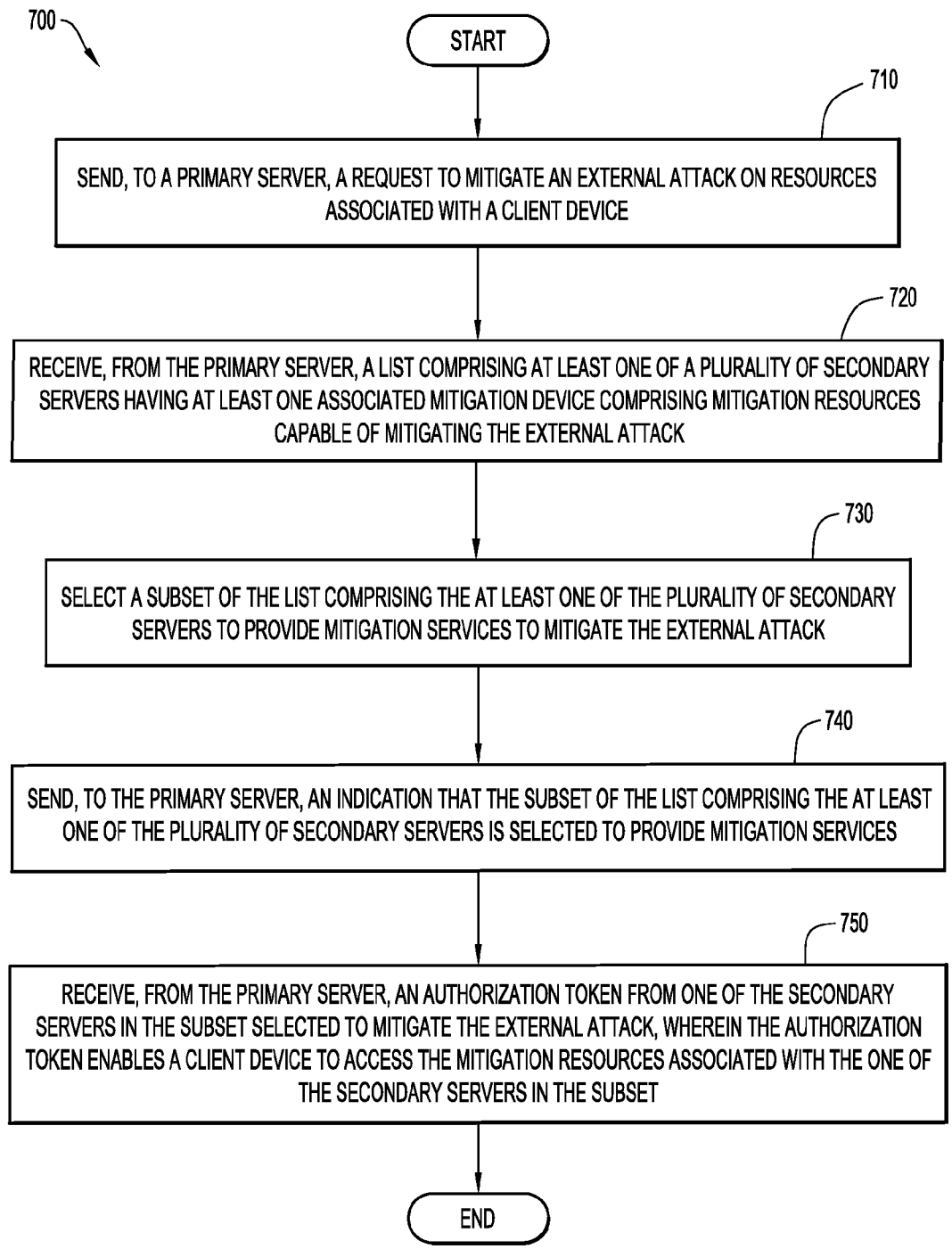
FIG. 7 is a flowchart depicting operations performed by a client device to request and access mitigation services to mitigate an ongoing denial of service attack on the client device, according to an example embodiment.

With reference to FIG. 7 and continued reference to FIGS. 1, 2, 3, 4 and 5, a flowchart is shown of a process 700 performed by a client device 110 to request and access mitigation services to mitigate an ongoing denial of service attack on the client device 110, according to an example embodiment.

At 710, client device 110 sends, to primary server 140, a request to mitigate an external attack on resources associated with client device 110.

At 720, client device 110 receives, from primary server 140, a list comprising at least one of a plurality of secondary servers 150(N) having at least one associated mitigation device comprising mitigation resources capable of mitigating the external attack.

At 730, client device 110 selects a subset of the list comprising the at least one of the plurality of secondary servers 150(N) to provide mitigation services to mitigate the external attack, and, at 750, sends to primary server 140, an indication that the subset of the list comprising the at least one of the plurality of secondary servers 150(N) is selected to provide mitigation services.

At 750, client device 110 receives, from primary server 140, an authorization token from one of the secondary servers 150(N) in the subset selected to mitigate the external attack, wherein the authorization token enables client device 110 to access the mitigation resources associated with the one of the secondary servers 150(N) in the subset, and method 700 ends.

The embodiments disclosed herein allow a client device, whose resources are the target of a malicious attack, to select and access mitigation resources capable of mitigating the attack without compromising the integrity of the client device or its incoming data flow. As disclosed herein, a client device may signal that an attack is occurring in a request for mitigation services from a primary server with which it has an existing agreement for mitigation services. If the primary server determines that it does not have the mitigation resources needed to mitigate the attack, it will send a query, including information related to the attack, to one or more secondary servers, which each use the information related to the attack to determine whether it has mitigation resources capable of mitigating the attack. Each of the secondary servers notifies the primary server whether it can mitigate the attack, and, in response, the primary server generates and forwards a list of the secondary servers that are capable of mitigating the attack to the client device.

Optionally, prior to sending a mitigation request to a plurality of secondary servers to mitigate an external attack, a primary server may send, to a client device, a candidate list of the plurality of secondary servers, wherein the candidate list of the plurality of secondary servers includes secondary servers that are candidates to provide services to mitigate the external attack. The primary server may then receive, from the client device, a subset of the candidate list of the plurality of secondary servers approved by the client device to mitigate the external attack such that the mitigation request is sent to only one or more of the plurality of secondary servers included in the subset approved to mitigate the external attack.

After receiving a list from the primary server of secondary servers capable of mitigating the attack, the client device selects a subset of this list and sends the primary server an indication that it has approved the secondary servers in the subset to provide mitigation services for the attack. As described, the subset of the list of secondary capable of mitigating the attack may include either a single secondary server or a plurality of secondary servers selected by the client device to mitigate the attack. The primary server then selects at least one of the secondary servers in the subset and sends a request for an authentication token to the at least one secondary server that it has selected to provide the mitigation resources. The primary server then forwards the received authorization token to the client device, which presents the authorization token to the selected at least one secondary server to gain access to the mitigation resources associated with the at least one secondary server, enabling the client device to forward incoming data traffic to associated mitigation resources for scrubbing. To confirm that the at least one secondary server is successfully mitigating the attack, the client device also generates at least one efficiency report related to the mitigation services and sends the at least one efficiency report to both the primary server and the at least one secondary server providing the mitigation services. The primary server may then request an efficiency report from the at least one secondary server providing the mitigation services and cross-check the information, e.g., data rate statistics, total amount of data scrubbed, etc., included in the efficiency report received from the at least one secondary server with that received from the primary server to confirm that the secondary server is successfully mitigating the attack.

Advantages of the embodiments include providing an additional layer of security for a client device by allowing it to control and restrict the leakage of sensitive information related to a target device as well as protecting the integrity of proprietary data flows received at the target device. The disclosed embodiments presented herein further help to restrict the flow of information leakage by requiring that a client device first approve a list of secondary servers having resources capable of mitigating an attack before a primary server may select one or more of the secondary servers in the list to mitigate the attack. Furthermore, an embodiment presented herein further restricts the flow of information related to the attack by requiring that a client device pre-approve each of the one or more secondary servers to which the primary server is authorized to send a mitigation request. In so doing, the client device described herein may restrict the flow of sensitive information to only those secondary servers that the client device knows and/or trusts.

In a further embodiment, a client device first presents an encrypted authorization token generated at a secondary server to the secondary server before gaining access to mitigation services associated with the secondary server. The embodiments described herein therefore facilitate a trusted environment because the client device receives the encrypted authorization token indirectly from a primary server that is itself trusted by both the client device and the secondary server. Finally, the embodiments described herein present a method in which a primary server may cross-check an efficiency report generated by a secondary server with that generated by the client device, enabling the primary server to confirm the efficacy of the mitigation services as well as to generate billing reports that accurately reflect the level of mitigation services provided by the secondary server.

In accordance with one embodiment, a method and system are disclosed in which a client device selects a list of one or more secondary servers that may be given details of a ongoing attack and provide services to mitigate the attack. A primary server selects a secondary server in the list of one or more secondary servers approved by the client device and requests an authorization token from the selected secondary server. The primary server then forwards the authorization token to the client device, which presents it back to the secondary server that originated the token to gain access to mitigation resources associated with the secondary server. Because the secondary server validates the authorization token prior to granting access to the mitigation resources, the secondary server may be confident that the client device is an authorized, i.e., trusted, third party. In so doing, the embodiment disclosed herein provides a method wherein a client device may securely select a secondary server to provide services to mitigate a malicious attack, and wherein the secondary server may securely grant the client device access to mitigation resources with which the secondary server is associated.

In one form, a method is provided comprising: at a primary server: receiving, from a client device, a first request to mitigate an external attack on resources associated with the client device; sending, to a plurality of secondary servers, a second request to mitigate the external attack, wherein each one of the plurality of secondary servers has at least one associated mitigation service comprising mitigation resources; receiving from at least one of the plurality of secondary servers an indication that the at least one of the plurality of secondary servers has mitigation resources capable of mitigating the external attack; sending to the client device, a list including the at least one of the plurality of secondary servers; receiving from the client device, an indication that a subset of the list including the at least one of the plurality of secondary servers is selected to mitigate the external attack; and sending a request for mitigation services to one of the secondary servers in the subset selected to mitigate the external attack.

In another form, a method is provided comprising: at a client device: sending, to a primary server, a request to mitigate an external attack on resources associated with the client device; receiving, from the primary server, a list comprising at least one of a plurality of secondary servers having at least one associated mitigation service comprising mitigation resources capable of mitigating the external attack; selecting a subset of the list including the at least one of the plurality of secondary servers to provide mitigation services to mitigate the external attack; sending, to the primary server, an indication that the subset of the list including the at least one of the plurality of secondary servers is selected to provide the mitigation services; and receiving, from the primary server, an authorization token from one of the secondary servers in the subset selected to mitigate the external attack, wherein the authorization token enables the client device to access the mitigation resources associated with the one of the secondary servers in the subset.

In yet another form, an apparatus is provided comprising: a network interface unit configured to enable network communications; and a processor, coupled to the network interface unit, and configured to: receive, from a client device, a first request to mitigate an external attack on resources associated with the client device; send, to a plurality of secondary servers, a second request to mitigate the external attack, wherein each one of the plurality of secondary servers has at least one associated mitigation service comprising mitigation resources; receive from at least one of the plurality of secondary servers an indication that the at least one of the plurality of secondary servers has mitigation resources capable of mitigating the external attack; send to the client device, a list including the at least one of the plurality of secondary servers; receive from the client device, an indication that a subset of the list including the at least one of the plurality of secondary servers is selected to mitigate the external attack; and send a request for mitigation services to one of the secondary servers in the subset selected to mitigate the external attack.

The above description is intended by way of example only. Various modifications and structural changes may be made therein without departing from the scope of the concepts described herein and within the scope and range of equivalents of the claims.

What is claimed is:
1. A method comprising:
   at a primary server:
      receiving, from a client device, a first request to mitigate an external attack on resources associated with the client device;
      sending, to a plurality of secondary servers, a second request to mitigate the external attack, wherein each one of the plurality of secondary servers has at least one associated mitigation service comprising mitigation resources;
      receiving from at least one of the plurality of secondary servers an indication that the at least one of the plurality of secondary servers has mitigation resources capable of mitigating the external attack;
sending to the client device, a list including the at least one of the plurality of secondary servers;
receiving from the client device, an indication that a subset of the list including the at least one of the plurality of secondary servers is selected to mitigate the external attack; and
sending a request for mitigation services to one of the plurality of secondary servers in the subset selected to mitigate the external attack,
wherein the operation of sending to the client device, a list including the at least one of the plurality of secondary servers, is performed prior to performing, by the one of the plurality of secondary servers in the subset selected to mitigate the attack, any mitigation of the external attack.

2. The method of claim 1, wherein the external attack is a Distributed Denial of Service (DDoS) attack and wherein the primary server and the plurality of secondary servers operate consistent with a DDoS Open Threat Signaling (DOTS) protocol.

3. The method of claim 1, further comprising receiving, from the client device, a first set of at least one efficiency report related to the mitigation services.

4. The method of claim 3, further comprising:
receiving, from the one of the plurality of secondary servers in the subset selected to mitigate the external attack, a second set of at least one efficiency report related to the mitigation services, wherein the second set of at least one efficiency report is associated with the first set received from the client device; and
reconciling the first set with the second set of at least one efficiency report.

5. The method of claim 1, wherein sending a request for mitigation services to the one of the secondary servers in the subset selected to mitigate the external attack further comprises:
sending a request for an authorization token to the one of the plurality of secondary servers in the subset selected to mitigate the external attack;
receiving an authorization token from the one of the plurality of secondary servers in the subset; and
forwarding the authorization token received from the one of the plurality of secondary servers in the subset to the client device, enabling the client device to access the mitigation resources associated with the one of the plurality of secondary servers in the subset.

6. The method of claim 5, wherein the authorization token received from the one of the plurality of secondary servers in the subset selected to provide the mitigation services is an Open Authorization (OAuth) 2.0 token.

7. The method of claim 1, wherein the list comprising the at least one of the plurality of secondary servers includes at least one attribute associated with each one of the at least one of the plurality of secondary servers, and wherein the subset of the list is selected based at least in part on the at least one attribute associated with each one of the at least one of the plurality of secondary servers.

8. The method of claim 7, wherein the at least one attribute associated with each one of the at least one of the plurality of secondary servers includes a geographical location of the at least one of the plurality of secondary servers, a geographical location of the at least one associated mitigation service, and at least one corporate or governmental entity associated with the at least one of the plurality of secondary servers.

9. The method of claim 1, further comprising
prior to sending the second request to the plurality of secondary servers to mitigate the external attack, sending, to the client device, a candidate list of the plurality of secondary servers, wherein the candidate list of the plurality of secondary servers includes secondary servers that are candidates to provide services to mitigate the external attack; and
receiving, from the client device, a subset of the candidate list of the plurality of secondary servers approved by the client device to mitigate the external attack such that the second request is sent to only one or more of the plurality of secondary servers included in the subset approved to mitigate the external attack.

10. A method comprising:
at a client device:
sending, to a primary server, a request to mitigate an external attack on resources associated with the client device;
receiving, from the primary server, a list comprising at least one of a plurality of secondary servers having at least one associated mitigation service comprising mitigation resources capable of mitigating the external attack;
selecting a subset of the list including the at least one of the plurality of secondary servers to provide mitigation services to mitigate the external attack;
sending, to the primary server, an indication that the subset of the list including the at least one of the plurality of secondary servers is selected to provide the mitigation services; and
receiving, from the primary server, an authorization token from one of the plurality of secondary servers in the subset selected to mitigate the external attack, wherein the authorization token enables the client device to access the mitigation resources associated with the one of the plurality of secondary servers in the subset and to mitigate the external attack,
wherein the operation of receiving, from the primary server, a list comprising at least one of a plurality of secondary servers, is performed prior to performing, by the one of the plurality of secondary servers in the subset selected to mitigate the external attack, any mitigation of the external attack.

11. The method of claim 10, wherein the external attack is a Distributed Denial of Service (DDoS) attack and the plurality of secondary servers operate consistent with a DDoS Open Threat Signaling (DOTS) protocol.

12. The method of claim 10, wherein the authorization token received from the one of the plurality of secondary servers in the subset selected to provide the mitigation services is an Open Authorization (OAuth) 2.0 token.

13. The method of claim 10, further comprising sending, to the primary server, a set of at least one efficiency report related to the mitigation services.

14. The method of claim 10, wherein the list of the at least one of the plurality of secondary servers includes at least one attribute associated with each one of the at least one of the plurality of secondary servers, and wherein the client device selects the subset of the list based at least in part on the at least one attribute associated with each one of the at least one of the plurality of secondary servers.

15. The method of claim 14, wherein the at least one attribute associated with each one of the at least one of the plurality of secondary servers includes a geographical location of the at least one of the plurality of secondary servers, a geographical location of the at least one associated mitigation service, and at least one corporate or governmental entity associated with the at least one of the plurality of secondary servers.

16. The method of claim 10, further comprising:
prior to receiving from the primary server the list including at least one of the plurality of secondary servers having at least one associated mitigation service comprising mitigation resources capable of mitigating the external attack, receiving, from the primary server, a candidate list of a plurality of secondary servers, wherein the candidate list of the plurality of secondary servers includes secondary servers that are candidates to provide services to mitigate the external attack; and
sending, to the primary server, a subset of the candidate list of a plurality of secondary servers approved by the client device to mitigate the external attack such that the primary server sends a request to mitigate the external attack to only one or more of the plurality of secondary servers included in the subset approved to mitigate the external attack.

17. An apparatus comprising:
a network interface unit implemented using at least one hardware device: configured to enable network communications; and
a hardware processor, coupled to the network interface unit, and configured to:
receive, from a client device, a first request to mitigate an external attack on resources associated with the client device;
send, to a plurality of secondary servers, a second request to mitigate the external attack, wherein each one of the plurality of secondary servers has at least one associated mitigation service comprising mitigation resources;
receive from at least one of the plurality of secondary servers an indication that the at least one of the plurality of secondary servers has mitigation resources capable of mitigating the external attack;
send to the client device, a list including the at least one of the plurality of secondary servers;
receive from the client device, an indication that a subset of the list including the at least one of the plurality of secondary servers is selected to mitigate the external attack; and
send a request for mitigation services to one of the plurality of secondary servers in the subset selected to mitigate the external attack,
wherein the processor is configured to send to the client device, a list including the at least one of the plurality of secondary servers, prior to the one of the plurality of secondary servers in the subset selected to mitigate the attack mitigates the external attack.

18. The apparatus of claim 17, wherein the processor is further configured to:
receive, from the client device, a first set of at least one efficiency report related to the mitigation services;
receive, from the one of the plurality of secondary servers in the subset selected to mitigate the external attack, a second set of at least one efficiency report related to the mitigation services, wherein the second set of at least one efficiency report is associated with the first set received from the client device; and
reconcile the first set with the second set of at least one efficiency report.

19. The apparatus of claim 17, wherein, when sending a request for mitigation services to the one of the plurality of secondary servers in the subset selected to mitigate the external attack, the processor is further configured to:
send a request for an authorization token to the one of the plurality of secondary servers in the subset selected to mitigate the external attack;
receiving an authorization token from the one of the plurality of secondary servers in the subset; and
forwarding the authorization token received from the one of the plurality of secondary servers in the subset to the client device, enabling the client device to access the mitigation resources associated with the one of the plurality of secondary servers in the subset.

20. The apparatus of claim 17, wherein the processor is further configured to:
prior to sending to a plurality of secondary servers the second request to mitigate the external attack, send to the client device a candidate list of a plurality of secondary servers, wherein the candidate list of the plurality of secondary servers includes secondary servers that are candidates to provide services to mitigate the external attack; and
receive, from the client device, a subset of the candidate list of a plurality of secondary servers approved to mitigate the external attack such that the second request is sent to only the secondary servers included in the subset approved by the client device to mitigate the external attack.

* * * * *